(12) United States Patent
Fraley

(10) Patent No.: US 11,371,651 B2
(45) Date of Patent: Jun. 28, 2022

(54) BEDSIDE COMMODE STABILIZATION DEVICE

(71) Applicant: Laura Fraley, Apopka, FL (US)

(72) Inventor: Laura Fraley, Apopka, FL (US)

(*) Notice: Subject to any disclaimer, the term of this patent is extended or adjusted under 35 U.S.C. 154(b) by 0 days.

(21) Appl. No.: 17/014,037

(22) Filed: Sep. 8, 2020

(65) Prior Publication Data

US 2021/0071810 A1    Mar. 11, 2021

Related U.S. Application Data

(60) Provisional application No. 62/897,562, filed on Sep. 9, 2019.

(51) Int. Cl.
| | | |
|---|---|---|
| *F16M 13/02* | (2006.01) | |
| *A47G 29/00* | (2006.01) | |
| *A47F 5/00* | (2006.01) | |
| *A47K 11/04* | (2006.01) | |
| *E04G 23/02* | (2006.01) | |

(52) U.S. Cl.
CPC ........... *F16M 13/022* (2013.01); *A47K 11/04* (2013.01); *E04G 23/0266* (2013.01); *F16M 2200/028* (2013.01); *F16M 2200/08* (2013.01)

(58) Field of Classification Search
CPC .... F16M 13/022; F16M 11/28; F16M 11/041; F16M 2200/028; F16M 2200/08; A47K 11/04
See application file for complete search history.

(56) References Cited

U.S. PATENT DOCUMENTS

| | | | | |
|---|---|---|---|---|
| 2,583,945 | A * | 1/1952 | Jacobs | A01G 23/099 |
| | | | | 254/108 |
| 4,685,157 | A | 8/1987 | James | |
| 5,023,962 | A | 6/1991 | Steljes | |
| 6,042,080 | A * | 3/2000 | Shepherd | B60R 11/00 |
| | | | | 248/163.1 |
| 6,234,440 | B1 * | 5/2001 | Boney | A47H 7/00 |
| | | | | 248/354.1 |
| 6,286,154 | B1 | 9/2001 | Pitts et al. | |
| 6,457,686 | B1 * | 10/2002 | Hill | A45D 20/12 |
| | | | | 248/122.1 |
| 7,152,833 | B1 * | 12/2006 | Pitsenbarger | A47B 97/00 |
| | | | | 248/161 |
| 7,603,817 | B2 * | 10/2009 | Lewis | E04F 21/185 |
| | | | | 52/127.2 |
| 9,140,025 | B2 * | 9/2015 | Barcroft | E04G 23/0266 |
| 10,835,433 | B2 | 11/2020 | Schwab et al. | |
| 2009/0090071 | A1 | 4/2009 | Hall | |

\* cited by examiner

*Primary Examiner* — Tan Le
(74) *Attorney, Agent, or Firm* — Allen Dyer et al.

(57) ABSTRACT

A bedside commode stabilization device includes a tubular outer member, a tubular inner member slidingly engaged with the outer member and configured to extend from inside an upper end of the tubular outer member in order to adjust an overall length of the stabilization device. The device also includes a spring loaded boss disposed on the tubular inner member and configured to be received by a series of apertures on the tubular outer member in order to secure the tubular outer member and the tubular inner member at a desired length. A clamp is secured to an upper end of the tubular inner member and is configured to be secured to a portion of a bedside commode. The device also includes a foot secured to a lower end of the device and is configured to provide a foundation when the device is wedged between the floor and the bedside commode.

18 Claims, 4 Drawing Sheets

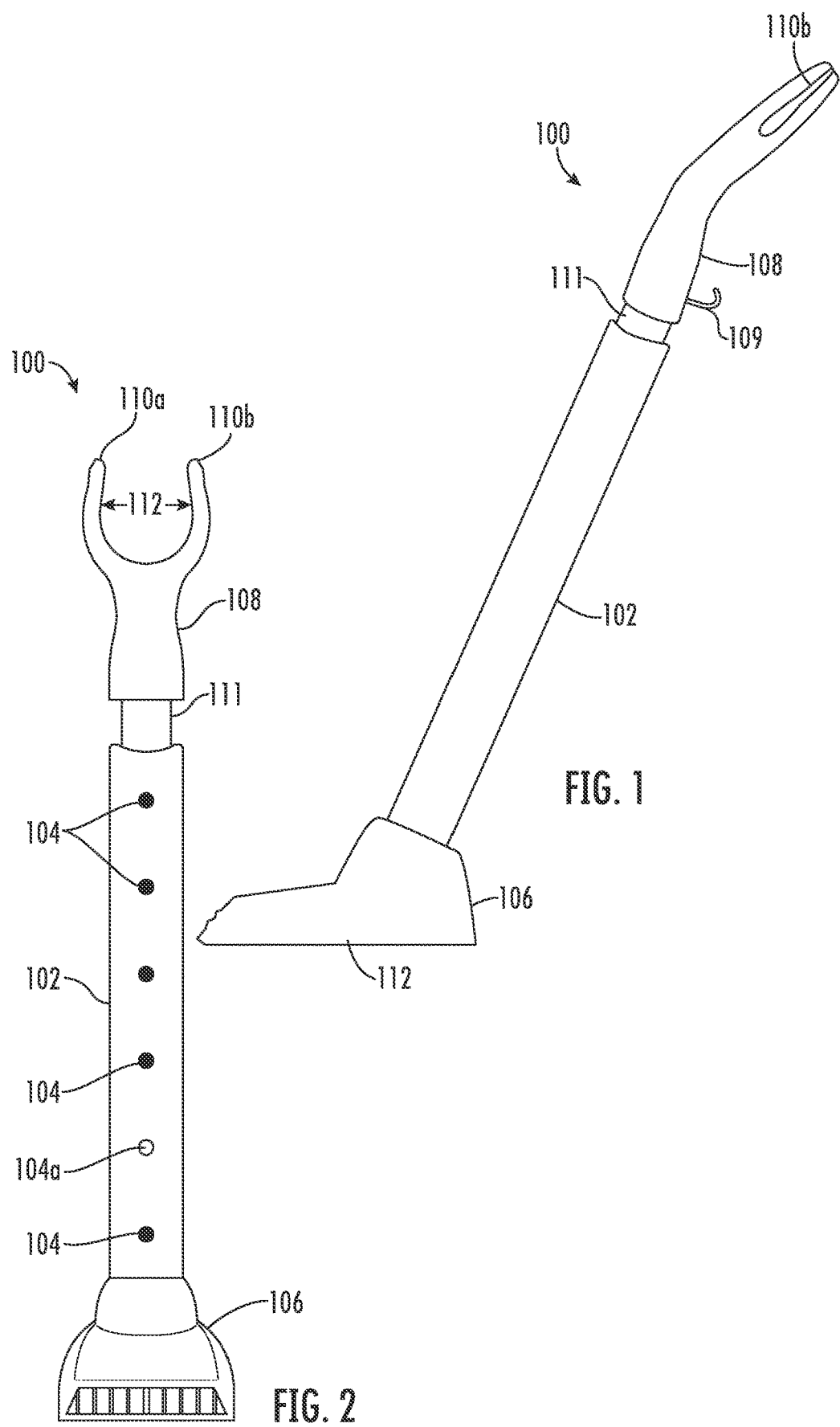

BEDSIDE COMMODE STABILIZATION DEVICE

CROSS-REFERENCE TO RELATED APPLICATIONS

This application claims the benefit of U.S. provisional application No. 62/897,562 filed Sep. 9, 2019, which is hereby incorporated herein in its entirety by reference.

TECHNICAL FIELD

The present invention relates to the field of health care, and, more particularly, to a bedside commode stabilization device.

BACKGROUND

Bedside commodes (BSC) are known in the industry as three in ones. Patients have often fallen from these types of bedside commodes as the commode can tip when a patient shifts their weight to address hygiene needs or to adjust clothing. The bedside commode can also be easily tipped when people with mobility restrictions attempt to transfer on to the bedside commode but do not sit with weight distributed in the correct way.

The bedside commode can also become unstable when a patient uses only one arm to lower themselves down or push themselves back up to standing. Most of the patient's weight is through one side of the bedside commode and this can cause it to tip.

Patients may avoid using bedside commodes due to the unsteadiness and end up trying to get to the regular toilet that was deemed unsafe for the patient. Some patients do use it but then fall. These falls have resulted in injuries and hospitalizations. It also calls on EMS resources to be used.

Even if the patient is not injured, the patient often requires skilled assistance to get off of the ground without causing injury. This can be embarrassing and traumatic for the mobility restricted patient.

SUMMARY

A bedside commode stabilization device is disclosed. The stabilization device includes a tubular outer member, a tubular inner member slidingly engaged with the outer member and configured to extend from inside an upper end of the tubular outer member in order to adjust a length of the stabilization device, and a series of apertures disposed on the tubular outer member that define adjustment points. In addition, the stabilization device includes a spring loaded boss disposed on the tubular inner member and configured to be received by the series of apertures in order to secure the tubular outer member and the tubular inner member at a desired length using a selected aperture. A clamp is secured to an upper end of the tubular inner member and is configured to be secured to a portion of a bedside commode. The clamp comprises a first grip and a second grip that extend from a top end of the clamp so that a cradle is formed between the first and second grips and configured to receive a portion of the bedside commode therein. The stabilization device also includes a foot secured to a lower end of the stabilization device and is configured to provide a foundation for the stabilization device. The foot comprises a non-skid material in order to keep the stabilization device from moving along a floor once the stabilization device is secured in place to the bedside commode.

BRIEF DESCRIPTION OF THE DRAWINGS

FIG. 1 is an elevational view of a bedside commode stabilization device in accordance with aspects of the disclosure;

FIG. 2 is a front view of the stabilization device of FIG. 1;

DETAILED DESCRIPTION

Figure 3:
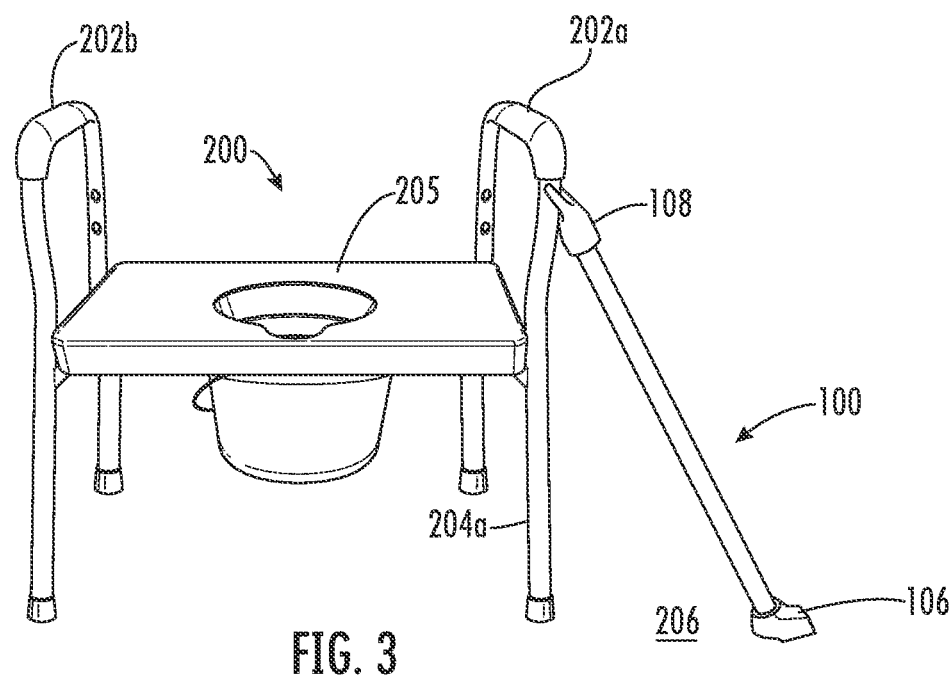
FIG. 3 is a perspective view of the stabilization device in use and secured to a front leg of a bedside commode.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

This unique bedside commode stabilization device (also referred to as "stabilization device") is designed to increase stability and to decrease fall risk due to bedside commode tipping. It is also designed to avoid becoming a tripping hazard itself by having the option to place the stabilization device in multiple different areas of contact with bedside commode and thus avoiding a walking pathway. The stabilization device is also covered with contrast coloring and reflective areas to increase the visibility of the stabilization device.

Referring now to FIGS. 1 and 2, a bedside commode stabilization device is disclosed and generally designated 100. In particular, the stabilization device decreases fall risks by patients who benefit from the use of assistive devices for mobility and/or ADL completion. For example, the stabilization device 100 increases the stability of a bedside commode and decreases the risk of tipping and injury to the patient.

The stabilization device 100 includes a tubular outer member 102 and a tubular inner member 111 slidingly engaged with the outer member 102. In particular, the tubular inner member 111 is configured to extend from inside an upper end of the tubular outer member 102 in order to adjust a length of the stabilization device 100. The tubular inner member 11 may be approximately ⅝ inches to ¾ inches in diameter and 15 inches in length so that is has sufficient strength not to bend under weight of a person. The tubular outer member 102 may be approximately ¾ inches to ⅞ inches in diameter and 15 inches or more in length and configured not to bend or crumple under the weight of a person.

The tubular outer member 102 may have a series of apertures 104 that define adjustment points. The series of apertures 104 are configured to receive a spring loaded boss 104a of the tubular inner member 111 in order to secure the tubular outer member 102 and the tubular inner member 111 at a desired length using a selected aperture 104.

Secured to an upper end of the tubular inner member 111 is a clamp 108 configured to be secured to a portion of a bedside commode as described in more detail below. The clamp 108 includes a first grip 110a and a second grip 110b that extend from a top end of the clamp 108. The first and second grips 110a, 110b may each extend approximately 2.5 inches to form a cradle 112 therebetween. The cradle may be approximately 1¼ to 1¾ inches in width. The cradle 112 is defined by the first and second grips 110a, 110b and configured to receive a portion of the bedside commode therein such as a leg or armrest of the bedside commode.

The first and second grips 110a, 110b may also be positioned at an angle so that they are not in axial alignment with the tubular outer member 102. For example, the first and second grips 110a, 110b may be offset and at an angle of approximately twenty degrees relative to a linear axis of the tubular outer member 102 in order to provide more leverage when secured to the bedside commode. The linear axis of the tubular outer member 102 is defined as an imaginary line from the upper end to the lower end of the tubular outer member 102.

The clamp 108 may also have a utility hook 109 secured thereto. Patients are able to hang a small bag that can hold items like toilet paper and wipes from the utility hook 109. In addition, the utility hook 109 with a bag hanging from it is another way to increase the visibility of the stabilization device 100 to decrease the risk of someone bumping into it.

A lower end of the stabilization device 100 includes a foot 106 that is used to provide a foundation for the stabilization device 100. A bottom 112 of the foot 106 may comprise a non-skid material in order to keep the stabilization device 100 from moving along a floor once the stabilization device 100 is secured in place to the bedside commode. The bottom 112 may be approximately 2 inches or more in length.

In addition, the bottom 112 of the foot 106 is not perpendicular to the linear axis of the tubular outer member 102. Instead, it may be offset at an angle so that when the bottom 112 is on the floor the tubular outer member 102 is leaning in order to provide more leverage when secured to the bedside commode. In a particular aspect, the tubular outer member 102 may be leaning approximately forty-five degrees to eighty degrees.

As bedside commodes are designed to fit in a variety of settings, the stabilization device 100 can be positioned in multiple ways to avoid interfering with the environment, such as a nearby wall or furniture. For example as shown in FIG. 3, the stabilization device 100 is secured to a front leg 204a of the bedside commode 200. The bedside commode 200 generally comprises a right armrest 202a and a left armrest 202b with a sitting platform 205 positioned therebetween. The stabilization device 100 is extended so that it can be wedged between the bedside commode 200 and the floor 206.

Figure 4:
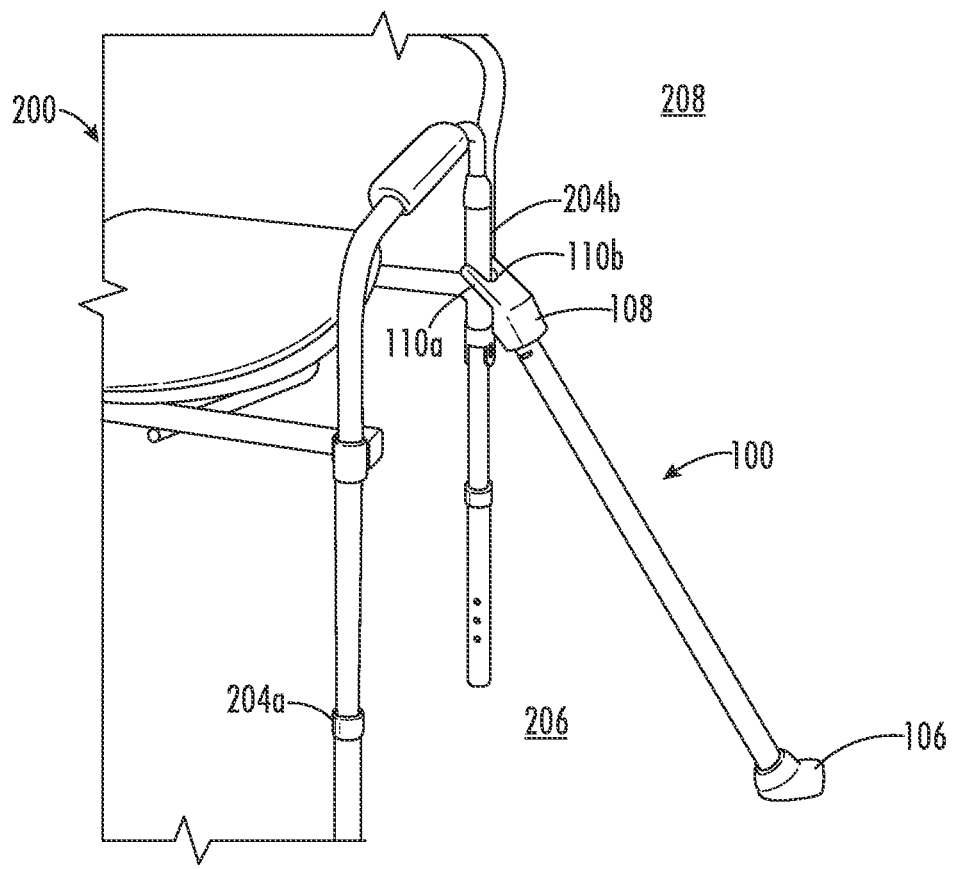
FIG. 4 is a perspective view of the stabilization device in use and secured to a rear leg of the bedside commode.

Referring now to FIG. 4, the stabilization device 100 is secured to a rear leg 204b of the bedside commode 200. The position of the stabilization device 100 is closer to a wall 208 than in FIG. 3 and more out of the way from foot traffic.

Figure 5:
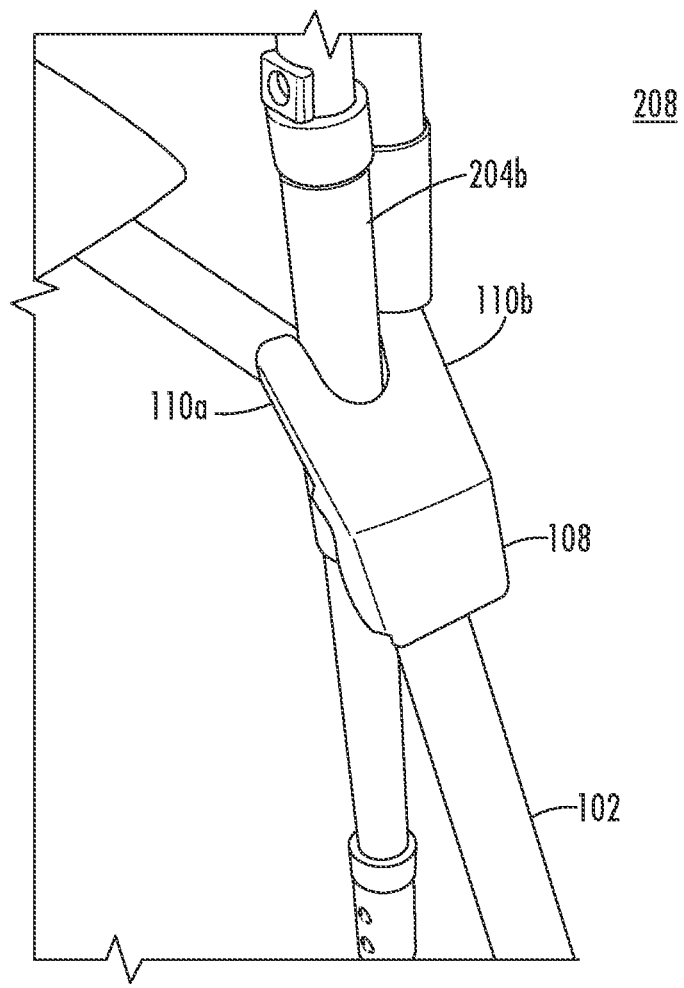
FIG. 5 is a detailed view of the stabilization device secured to the rear leg of the bedside commode.

As best viewed in FIG. 5, the clamp 108 comprises a first grip 110a and a second grip 110b that are spaced apart a distance to engage the rear leg 204b.

Figure 6:
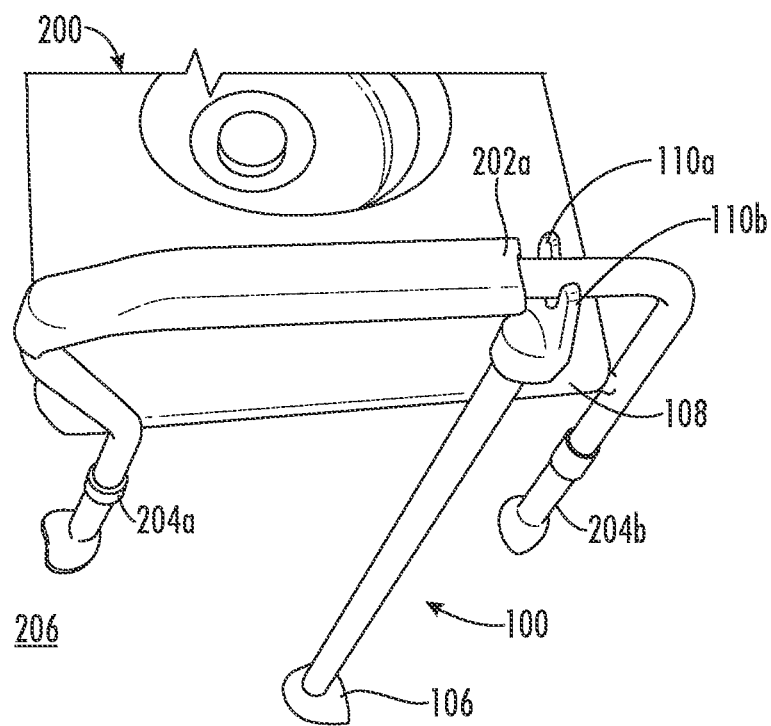
FIG. 6 is a perspective view of the stabilization device secured to an armrest of the bedside commode.

The stabilization device 100 may also be secured using the right armrest 202a (or left armrest 202b), for example, as shown in FIG. 6. The stabilization device 100 has a more upright/vertical orientation relative to the bedside commode 200 compared to when the stabilization device is secured to the legs of the bedside commode 200. As those of ordinary skill in the art can appreciate, the stabilization device 100 may be secured in a number of different locations to the bedside commode 200 for stability.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A bedside commode stabilization device, the device comprising:
a tubular outer member;
a tubular inner member slidingly engaged with the outer member and configured to extend from inside an upper end of the tubular outer member in order to adjust an overall length of the stabilization device;
an elbow having a proximate end secured to an upper end of the tubular inner member and a distal end having a different alignment to the proximate end;
a first grip and a second grip extending from the distal end of the elbow so that a cradle is formed between the first and second grips and configured to receive a portion of the bedside commode therein; and
a foot secured to a lower end of the tubular outer member and configured to provide a foundation for the stabilization device, the foot comprising a non-skid material in order to keep the stabilization device from moving along a floor once the stabilization device is secured in place to the bedside commode;
wherein the elbow having a bend so that the first and second grips have the same offset relative to a linear axis of the tubular outer member.

2. The bedside commode stabilization device of claim 1, further comprising a series of apertures disposed on the tubular outer member that define adjustment points; and
a spring loaded boss disposed on the tubular inner member that is configured to be received by the series of apertures in order to secure the tubular outer member and the tubular inner member at a desired length using a selected aperture.

3. The bedside commode stabilization device of claim 1, further comprising a utility hook secured to the clamp and configured to hang articles thereon.

4. The bedside commode stabilization device of claim 1, wherein the tubular inner member is approximately ⅝ inches to ¾ inches in diameter and 15 inches in length.

5. The bedside commode stabilization device of claim 1, wherein the tubular outer member is approximately ¾ inches to ⅞ inches in diameter and 15 inches or more in length.

6. The bedside commode stabilization device of claim 1, wherein the offset is an angle of approximately twenty degrees.

7. The bedside commode stabilization device of claim 1, wherein the bottom of the foot is offset at an angle so that the tubular outer member is leaning when the bottom is on the floor in order to provide more leverage when secured to the bedside commode.

8. The bedside commode stabilization device of claim 7, wherein the tubular outer member is leaning approximately forty-five degrees to eighty degrees.

9. A method of manufacturing a bedside commode stabilization device, the method comprising:
providing a tubular outer member;

slidingly engaging a tubular inner member with the tubular outer member to extend from inside an upper end of the tubular outer member in order to adjust a length of the stabilization device;

securing an elbow having a proximate end to an upper end of the tubular inner member and a distal end having a different alignment to the proximate end;

a first grip and a second grip extending from the distal end of the elbow so that a cradle is formed between the first and second grips and configured to receive a portion of the bedside commode therein; and securing a foot to a lower end of the stabilization device and configured to provide a foundation for the stabilization device, the foot comprising a non-skid material in order to keep the stabilization device from moving along a floor once the stabilization device is secured in place to the bedside commode;

wherein the elbow having a bend so that the first and second grips have the same offset relative to a linear axis of the tubular outer member.

10. The method of manufacturing a bedside commode stabilization device of claim 9, further comprising, defining a series of apertures on the tubular outer member to serve as adjustment points; and positioning a spring loaded boss on the tubular inner member that is configured to be received by the series of apertures in order to secure the tubular outer member and the tubular inner member at a desired length using a selected aperture.

11. The method of manufacturing a bedside commode stabilization device of claim 9, further comprising securing a utility hook to the clamp that is configured to hang articles thereon.

12. The method of manufacturing a bedside commode stabilization device of claim 9, wherein the tubular inner member is approximately ⅝ inches to ¾ inches in diameter and 15 inches in length.

13. The method of manufacturing a bedside commode stabilization device of claim 9, wherein the tubular outer member is approximately ¾ inches to ⅞ inches in diameter and 15 inches or more in length.

14. The method of manufacturing a bedside commode stabilization device of claim 9, wherein the offset is an angle of approximately twenty degrees.

15. The method of manufacturing a bedside commode stabilization device of claim 9, wherein the bottom of the foot is offset at an angle so that the tubular outer member is leaning when the bottom is on the floor in order to provide more leverage when secured to the bedside commode.

16. The method of manufacturing a bedside commode stabilization device of claim 15, wherein the tubular outer member is leaning approximately forty-five degrees to eighty degrees.

17. A bedside commode stabilization device, the device comprising:

an elongated tubular member configured to adjust in length;

an elbow having a proximate end secured to an upper end of the elongated tubular member and a distal end having a different alignment to the proximate end;

a first grip and a second grip extending from the distal end of the elbow so that a cradle is formed between the first and second grips and configured to receive a portion of the bedside commode therein; and a foot secured to a lower end of the elongated tubular member and configured to provide a foundation for the stabilization device, the foot comprising a non-skid material in order to keep the stabilization device from moving along a floor once the stabilization device is secured in place to the bedside commode;

wherein the elbow having a bend so that the first and second grips are offset relative to a linear axis of the tubular outer member.

18. The bedside commode stabilization device of claim 17, wherein the foot is offset from the linear axis in an opposite direction than the clamp.

* * * * *